(12) United States Patent
Crawley et al.

(10) Patent No.: US 9,197,423 B2
(45) Date of Patent: *Nov. 24, 2015

(54) ELECTROSTATIC DISCHARGE PROTECTION CIRCUIT

(75) Inventors: Philip John Crawley, Sacramento, CA (US); Amit Gattani, Roseville, CA (US); John R. Camagna, El Dorado Hills, CA (US); Jun Cai, Mather, CA (US)

(73) Assignee: AKROS SILICON, INC., San Jose, CA (US)

( * ) Notice: Subject to any disclaimer, the term of this patent is extended or adjusted under 35 U.S.C. 154(b) by 823 days.

This patent is subject to a terminal disclaimer.

(21) Appl. No.: 12/031,609

(22) Filed: Feb. 14, 2008

(65) Prior Publication Data
US 2009/0207538 A1    Aug. 20, 2009

(51) Int. Cl.
*H02H 9/00*    (2006.01)
*H04L 12/10*    (2006.01)

(52) U.S. Cl.
CPC ..................................... *H04L 12/10* (2013.01)

(58) Field of Classification Search
None
See application file for complete search history.

(56) References Cited

U.S. PATENT DOCUMENTS

| | | | |
|---|---|---|---|
| 5,287,008 A * | 2/1994 | Pahr | 307/91 |
| 6,671,147 B2 * | 12/2003 | Ker et al. | 361/56 |
| 2004/0257743 A1 * | 12/2004 | Chen et al. | 361/119 |
| 2005/0053229 A1 * | 3/2005 | Tsatsanis et al. | 379/406.01 |
| 2005/0236673 A1 * | 10/2005 | Woo et al. | 257/355 |
| 2005/0286188 A1 * | 12/2005 | Camp et al. | 361/56 |
| 2006/0007614 A1 * | 1/2006 | Pozzuoli et al. | 361/62 |
| 2006/0082220 A1 * | 4/2006 | Karam et al. | 307/4 |
| 2008/0062586 A1 * | 3/2008 | Apfel | 361/18 |

* cited by examiner

*Primary Examiner* — Rexford Barnie
*Assistant Examiner* — Justen Fauth

(57) ABSTRACT

A network device comprises an interface coupling an electronic device to a differential pair of signal lines, and an integrated active common mode suppression and electrostatic discharge protection circuit coupled to the interface in parallel to differential signal lines of the electronic device. First and second resistors are respectively coupled to the differential lines between the integrated active common mode suppression and electrostatic discharge protection circuit and the electronic device.

11 Claims, 14 Drawing Sheets

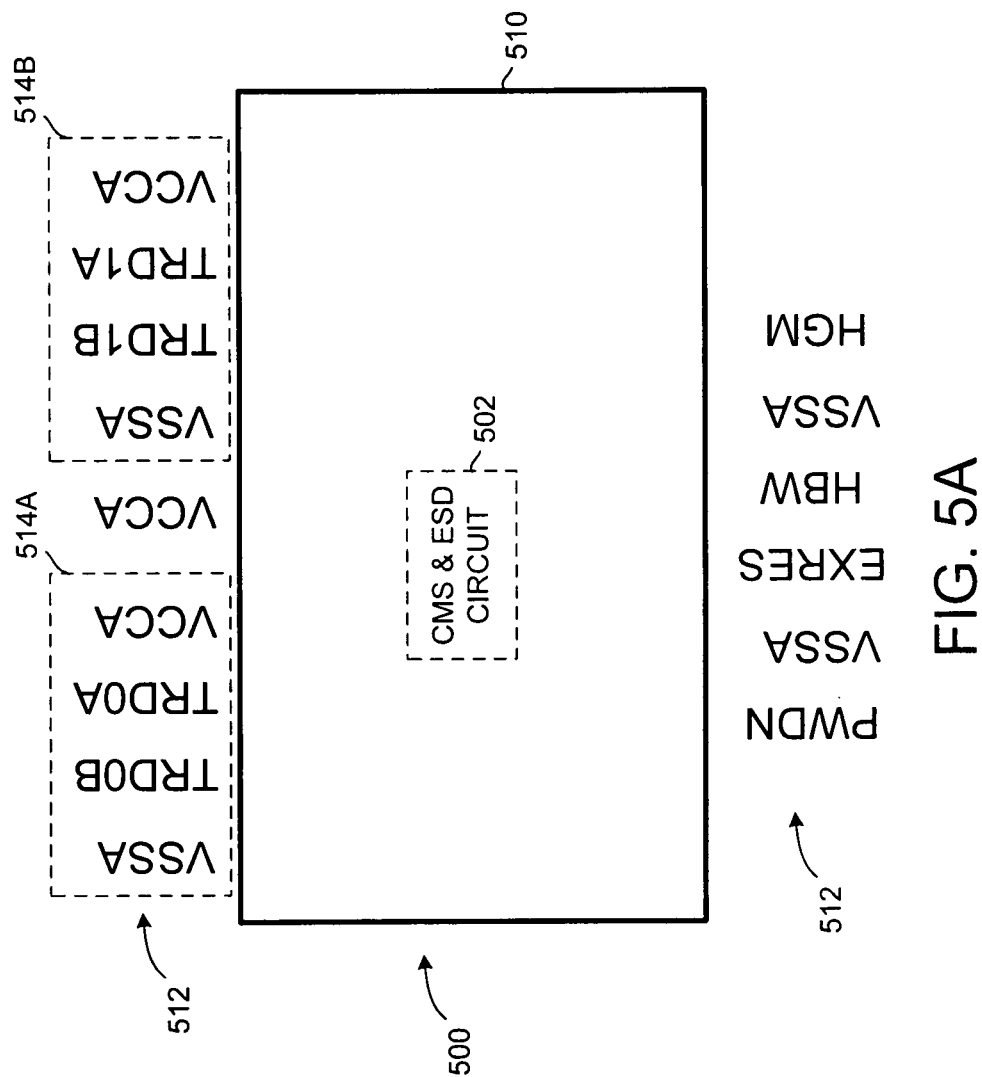

ELECTROSTATIC DISCHARGE PROTECTION CIRCUIT

BACKGROUND

Many networks such as local and wide area networks (LAN/WAN) structures are used to carry and distribute data communication signals between devices. Various network elements include hubs, switches, routers, and bridges, peripheral devices, such as, but not limited to, printers, data servers, desktop personal computers (PCs), portable PCs and personal data assistants (PDAs) equipped with network interface cards. Devices that connect to the network structure use power to enable operation. Power of the devices may be supplied by either an internal or an external power supply such as batteries or an AC power via a connection to an electrical outlet.

Some network solutions can distribute power over the network in combination with data communications. Power distribution over a network consolidates power and data communications over a single network connection to reduce installation costs, ensures power to network elements in the event of a traditional power failure, and enables reduction in the number of power cables, AC to DC adapters, and/or AC power supplies which may create fire and physical hazards. Additionally, power distributed over a network such as an Ethernet network may function as an uninterruptible power supply (UPS) to components or devices that normally would be powered using a dedicated UPS.

Additionally, network appliances, for example voice-over-Internet-Protocol (VOIP) telephones and other devices, are increasingly deployed and consume power. When compared to traditional counterparts, network appliances use an additional power feed. One drawback of VOIP telephony is that in the event of a power failure the ability to contact emergency services via an independently powered telephone is removed. The ability to distribute power to network appliances or circuits enable network appliances such as a VOIP telephone to operate in a fashion similar to ordinary analog telephone networks currently in use.

Distribution of power over Ethernet (PoE) network connections is in part governed by the Institute of Electrical and Electronics Engineers (IEEE) Standard 802.3 and other relevant standards, standards that are incorporated herein by reference. However, power distribution schemes within a network environment typically employ cumbersome, real estate intensive, magnetic transformers. Additionally, power over Ethernet (PoE) specifications under the IEEE 802.3 standard are stringent and often limit allowable power.

Silicon-based electronic devices are susceptible to damage from spurious events that exert voltage/current stresses exceeding the normal operating limits of the devices. Electrostatic discharge (ESD) is sudden, brief electric current that flows between objects at different electrical potentials, typically momentary unwanted and potentially destructive currents that may cause damage to electronic equipment. ESD typically arises as air discharge and cable discharge, which is particularly insidious. ESD is common problem that is difficult to address. Stress events can be surges on the power line originating from causes such as lightning strikes, but can also originate from human body discharge. If the stress event lasts sufficiently long or the spike in voltage is sufficiently severe, momentary current along a temporary path through the substrate can cause failure through overheating, which causes the silicon or metal to reach the melting point. Lighting and electro-static discharge (ESD) events can be very fast, with time constants as short as 6 ns. The maximum voltage overstress during an event is typically determined by the reaction time of protection devices so that small parasitic changes can cause large variations in the magnitude of overstress.

SUMMARY

According to an embodiment of a network device, an interface couples an electronic device to a differential pair of signal lines. An integrated active common mode suppression and electrostatic discharge protection circuit is coupled to the interface in parallel to differential signal lines of the electronic device. First and second resistors are respectively coupled to the differential lines between the integrated active common mode suppression and electrostatic discharge protection circuit and the electronic device.

BRIEF DESCRIPTION OF THE DRAWINGS

Embodiments of the invention relating to both structure and method of operation may best be understood by referring to the following description and accompanying drawings:

FIGS. 5A and 5B are pictorial diagrams illustrating embodiments of network devices comprising an integrated circuit package with integrated circuit (IC) pins coupled to an integrated active EMI suppression and ESD protection circuit;

DETAILED DESCRIPTION

Figure 1:
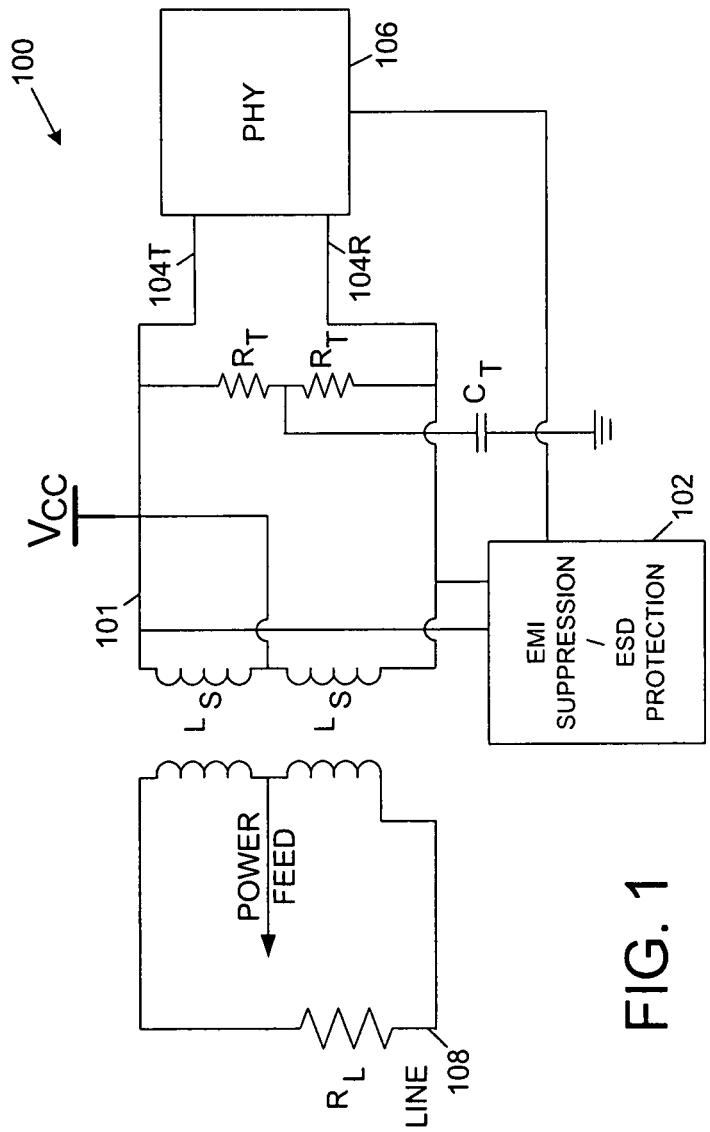
FIG. 1 is a schematic block and circuit diagram showing an embodiment of a network device that includes an integrated active EMI suppression and ESD protection circuit.

In an illustrative architecture of a common-mode suppression circuit, a common-mode suppression amplifier is coupled to output lines of an electronic device. Electrostatic discharge (ESD) protection can be added in embodiments that replace the common-mode suppression circuit with an active common mode suppression and electrostatic discharge protection circuit coupled in parallel to transmit and receive differential signal lines connecting an electronic device module and a network connector. Thus, the combination of surge protection and electromagnetic interference (EMI) suppression, for example common-mode active choke suppression, can be integrated within the same device. In a transformer-less configuration, the circuit can replace electromagnetic interference (EMI) suppression chokes that are included in modern Ethernet transformers. Other embodiments can replace the common-mode suppression circuit with an ESD component. Accordingly, ESD protection can be added to electromagnetic interference (EMI) suppression by inclusion of surge protection functionality in some embodiments. Some embodiments can combine a surge protection configuration with usage of resistors, either including or excluding EMI suppression. Resistors are useful both for EMI suppression and surge in combination or individually. In some embodiments depicted herein, an independent surge component can be formed in an integrated circuit (IC), integrating surge protection into the IC. ESD protection, either alone or in combination with EMI suppression, can be implemented in Ethernet applications or in generic interface configurations.

In accordance with various embodiments of a network device, an integrated active common mode electromagnetic interference (EMI) suppression and electrostatic discharge (ESD) protection circuit improves noise and protection performance. With regard to EMI suppression, in an illustrative embodiment a single-chip active choke common-mode suppression device enables ElectroMagnetic Compatibility (EMC) Class B compliance and improves common-mode rejection, for example by up to 10 dB or more in comparison to a transformer-based design. Thus, the integrated active EMI suppression and ESD protection circuit enables elevation of performance from Class A to Class B compliance level. In Ethernet embodiments, EMI performance of the illustrative integrated active EMI suppression and ESD protection circuit improves differential-to-common mode balance of Ethernet lines and shunts all common-mode noise locally, reducing emissions on the line.

With regard to electrostatic discharge (ESD) protection performance, for Ethernet implementations the integrated active EMI suppression and ESD protection circuit enables robust ESD protection for Ethernet physical layers (PHYs) and enables system designers to meet a highest level of ESD protection compliance. In particular embodiments, ESD protection circuits can attain air discharge protection of more than ±25 kV and cable discharge equivalent (CDE) protection of more than ±12 kV, enabling protection of fine geometry PHY transceivers.

The illustrative integrated active EMI suppression and ESD protection circuit operates with any standard Ethernet transformer and PHY. In Ethernet implementations, the illustrative embodiments of the integrated active EMI suppression and ESD protection circuit operate with a standard Ethernet transformer and various PHYs (10/100/1000). The integrated active EMI suppression and ESD protection circuit can be formed with a small form factor and a package designed for ease of board layout, for example as an in-line component. The integrated active EMI suppression and ESD protection circuit can otherwise be configure for usage with a generic interface. The integrated active EMI suppression and ESD protection circuit can be configured for single supply operation, for example 2.5V/3.3V, with a supply to the EMI suppression and ESD protection integrated circuit chip and industrial temperature ranges.

Referring to FIG. 1, a schematic block and circuit diagram illustrates an embodiment of a network device 100 comprising an interface 101 coupling an electronic device 106 to a differential pair of signal lines 104T, 104R, and an integrated active common mode suppression and electrostatic discharge (ESD) protection circuit 102 coupled to the interface 101 in parallel to differential signal lines 104T, 104R of the electronic device 106. First and second resistors respectively coupled to the differential lines between the integrated active common mode suppression and electrostatic discharge protection circuit and the electronic device. Addition of the resistors of a suitable size increase ESD performance. For example, resistors with a resistance of the order of one ohm can be used although smaller or larger resistors can be used in various applications and embodiments.

In another embodiment, a network device 100 can comprise an interface 101 coupling an electronic device 106 to a differential pair of signal lines 104T, 104R, and an active common mode suppression circuit 102 coupled to the interface 101 in parallel to differential signal lines 104T, 104R of the electronic device 106. First and second resistors can be respectively coupled to the differential lines between the active common mode suppression circuit and the electronic device.

The integrated active common mode suppression and electrostatic discharge protection circuit 102 includes electromagnetic interference protection functionality in the manner of a shunt choke or choke. The integrated active common mode suppression and electrostatic discharge protection circuit (CMS) 102 is connected in parallel to the same wires 104T, 104R as the electronic device 106 whereby the shunt choke terminology is descriptive of the parallel connection. The integrated active common mode suppression and electrostatic discharge protection circuit 102 operates as a functional block, coupled in parallel to the signal lines 104T, 104R, that supplies a very low common mode impedance termination and electrostatic discharge (ESD) protection. Accordingly, within a broad range of frequencies common mode noise in the system is absorbed by the integrated active common mode suppression and electrostatic discharge protection circuit 102. In combination with an inherent common-mode noise rejection capability of the transformer, the active suppression circuit can enable system compliance with FCC Part 15 Class B compliance.

Figure 2:
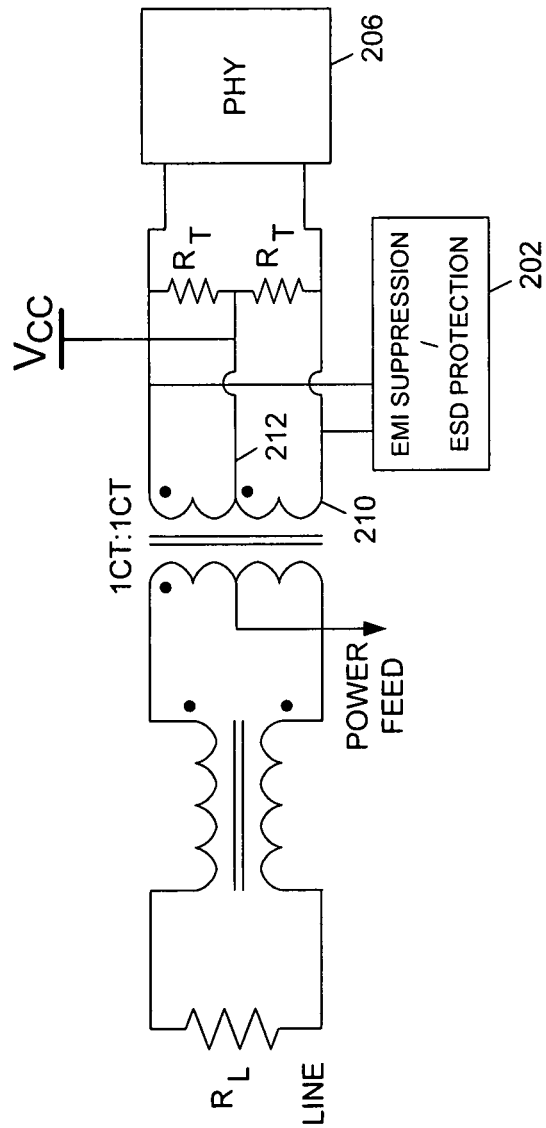
FIG. 2 is a schematic block and circuit diagram showing an embodiment of a integrated active electromagnetic interference (EMI) suppression and electrostatic discharge (ESD) protection circuit that may be used in conjunction with an Ethernet physical layer (PHY)

The integrated active common mode suppression and electrostatic discharge protection circuit 102 performs aspects of a traditional choke in a shunt choke and ESD protection circuit 202 that may be used in conjunction with an Ethernet PHY 206 as shown in FIG. 2. The Ethernet PHY 206 has signal lines coupled to a traditional transformer 210. The choke and protection device 202 is depicted as horizontal windings coupled to the transformer 210. The common mode suppression and electrostatic discharge protection circuit 102 depicted in FIG. 1 performs aspects of the choke functionality in active circuitry. The integrated active common mode suppression and electrostatic discharge protection circuit 102 is configured to interface to standard Ethernet PHY blocks that are traditionally used with transformer-based network devices. Standard Ethernet PHY blocks have either Class-A or Class-B drivers that use the transformer center-tap 212 for direct current (DC) biasing. The center tap 212 of the transformer 210 thus sets the DC voltage for the lines 104T and 104R. In a typical implementation output common mode DC voltage of the PHY can vary in a range up to the supply voltage Vcc, for example Vcc can be 3.3V, 2.5V, 1.8V, or any voltage desired by the Ethernet PHY manufacturer. The PHY output voltage swing Vout_swing, which is derived from the common mode DC voltage, can also vary greatly, for example from 0.85V to 5.0V depending on supplied power and Ethernet type, for example 10baseT or Fast Ethernet (100baseT), or Gigabit Ethernet (1000baseT).

In a network device configuration such as shown in FIG. 2 that includes a transformer 212, the transformer 212 can be powered-on and powered-off in some applications. The shunt choke and ESD protection device 202 suppresses EMI in response to perturbations in power through the transformer 212.

Referring again to FIG. 1, the interface 101 and associated integrated active common mode suppression and electrostatic discharge protection circuit 102 can be Ethernet interface that couples a differential pair network connector to an Ethernet physical layer (PHY) and can be used in applications with a transformer, such as an Ethernet transformer, or with applications that omit a transformer. The parallel connection of an ESD protection to the PHY can be extended beyond PHY to other interfaces such as USB, enabling designers to meet a highest level of ESD compliance. Thus, in various implementations and embodiments a transformer can be included or omitted. For example the interface 101 can be a generic differential interface such as Universal Serial Bus (USB), Institute of Electrical and Electronics Engineers (IEEE) 1394, High-Definition Multimedia Interface (HDMI), DisplayPort standard as defined by Video Electronics Standards Association (VESA), Digital Visual Interface (DVI), audio signals, and other interfaces. In such generic interfaces, the system may not include a transformer.

Referring again to FIG. 1, in some embodiments the electronic device 106 can be an Ethernet Physical Layer (PHY) and the interface 101 can be an Ethernet interface that couples a differential pair network connector to an Ethernet physical layer (PHY). An example of typical constraints imposed by usage of the Ethernet PHY include an external load at high frequency is limited by $R_T$, for example 50Ω, Ethernet common mode termination plus parasitic capacitance at the node. The $R_T$ Ethernet common mode termination, depicted as $R_T$ resistors at input lines to the Ethernet PHY, in combination with parasitic capacitors that typically exist in the system add on the order of 20 pF of shunt loading. In a specific design example, common mode rejection ratio may be specified to a frequency of 100 MHz. Consequently, a suitable common mode noise suppression circuit may be specified to include a reasonably high loop gain at 100 MHz. The specification is addressed by implementing a reasonably high loop gain in the specified frequency range. The common mode noise suppression circuit design includes a fundamental trade-off between loop stability and common mode rejection ratio (CMRR) performance. Accordingly, the shunt choke 102 is configured to have suitable high frequency performance to address the loading due to the common mode resistance and parasitic capacitance. In the illustrative example, the loading by a resistance of $R_T$, for example 50Ω, and parasitic capacitance of 20 pF results in a frequency behavior including a pole at 160 MHz in combination with a performance specification imposed on the choke of suitable performance up to 100 MHz. Thus, in the illustrative example, the design challenge is to configure the integrated active common mode suppression and electrostatic discharge protection circuit 102 to have very good rejection at 100 MHz when limited by a 160 MHz pole.

With regard to stability, an analog closed loop can have stable and nonstable operating zones. For example in a configuration with a pole at 160 MHz, good common mode rejection performance imposes specification of a high gain at 100 MHz, contrary to a specification to attain loop stability. In an illustrative design, stability criteria may be addressed by enabling the output stage to roll-off while the input stage maintains high gain.

In various embodiments, the interface 101 can be constructed for compatibility with various standards. For example, the interface 101 can be implemented based on n-channel metal oxide semiconductor (NMOS) devices, p-channel metal oxide semiconductor (PMOS) devices, or a combination of NMOS and PMOS devices. An implementation of the interface 101 with a shunt choke 102 that includes only an NMOS output stage conserves circuit area and improves electrostatic discharge (ESD) performance.

The interface 101 and integrated active common mode suppression and electrostatic discharge protection circuit 102 can be used in any suitable network device configuration. For example, the interface 101 and integrated active common mode suppression and electrostatic discharge protection circuit 102 can be used with line transformers or direct connect interfaces.

In various Ethernet embodiments, the common mode suppression and electrostatic discharge protection circuit can be implemented on either the line side or the device side of the Ethernet transformer. For example, isolated powering can be used to power the device on the line side by using techniques disclosed in U.S. Pat. No. 7,797,558 entitled "POWER OVER ETHERNET WITH ISOLATION," by Sajol Ghoshal, filed Nov. 22, 2006 and issued Sep. 14, 2010; U.S. Pat. No. 7,701,731 entitled "SIGNAL COMMUNICATION ACROSS AN ISOLATION BARRIER," by Timothy A. Dhuyvetter, et al., filed on Feb. 13, 2007 and issued Apr. 20, 2010; U.S. patent application Ser. No. 11/627,345 entitled "PARTITIONED SIGNAL AND POWER TRANSFER ACROSS AN ISOLATION BARRIER," by Philip John Crawley, et al., filed on Feb. 13, 2007; U.S. patent application Ser. No. 11/683,985 entitled "DIGITAL ISOLATOR," by Philip John Crawley, et al., filed on Mar. 8, 2007; and U.S. patent application Ser. No. 11/747,797 entitled "DIGITAL ISOLATOR INTERFACE WITH PROCESS TRACKING," by Philip John Crawley, et al., filed on May 11, 2007 which are incorporated by reference into the present application in their entirety for all purposes.

Figure 3:
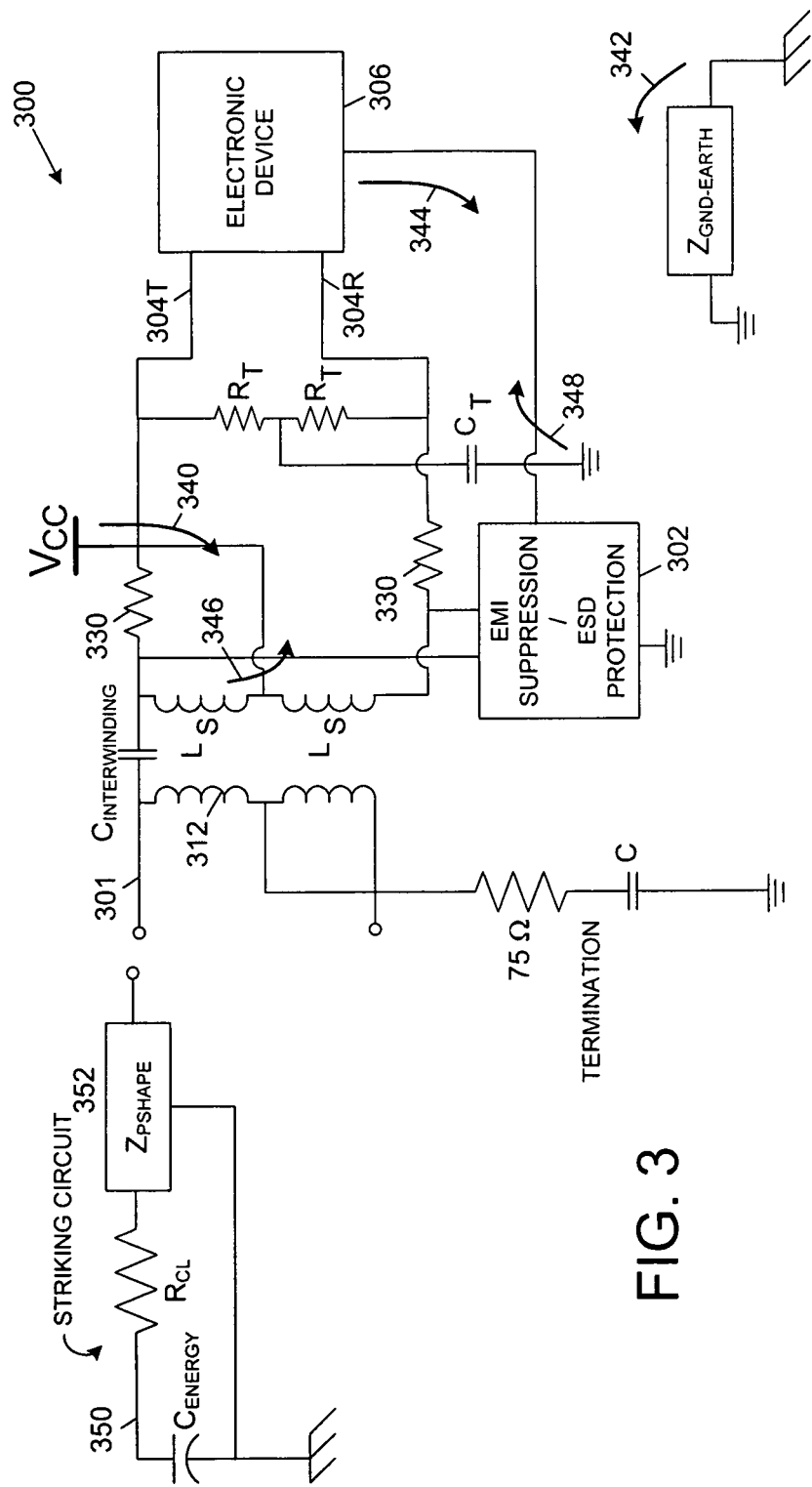
FIG. 3 is a schematic circuit and block diagram depicting an example of system noise coupling paths for emissions that may arise in a network device that includes an integrated active EMI suppression and ESD protection circuit.

Referring to FIG. 3, a schematic circuit and block diagram illustrates an embodiment of a network device 300 that implements electrostatic discharge (ESD) protection. The network device 300 comprises an interface 301 coupling an electronic device 306 to a differential pair of signal lines 304T, 304R, and an integrated electrostatic discharge protection circuit 302 coupled to the interface 301 in parallel to differential signal lines 304T, 304R of the electronic device 306.

ESD protection performance can be improved by coupling resistors 330 to each of the differential lines 304T, 304R between the integrated electrostatic discharge protection circuit and the electronic device 302. In various embodiments, components other than resistors 330 can be used as series surge protection elements. For example the resistors can be replaced by ferrite beads and can be suitable in some applications, although usage of resistors 330 can have similar performance.

Figure 8:
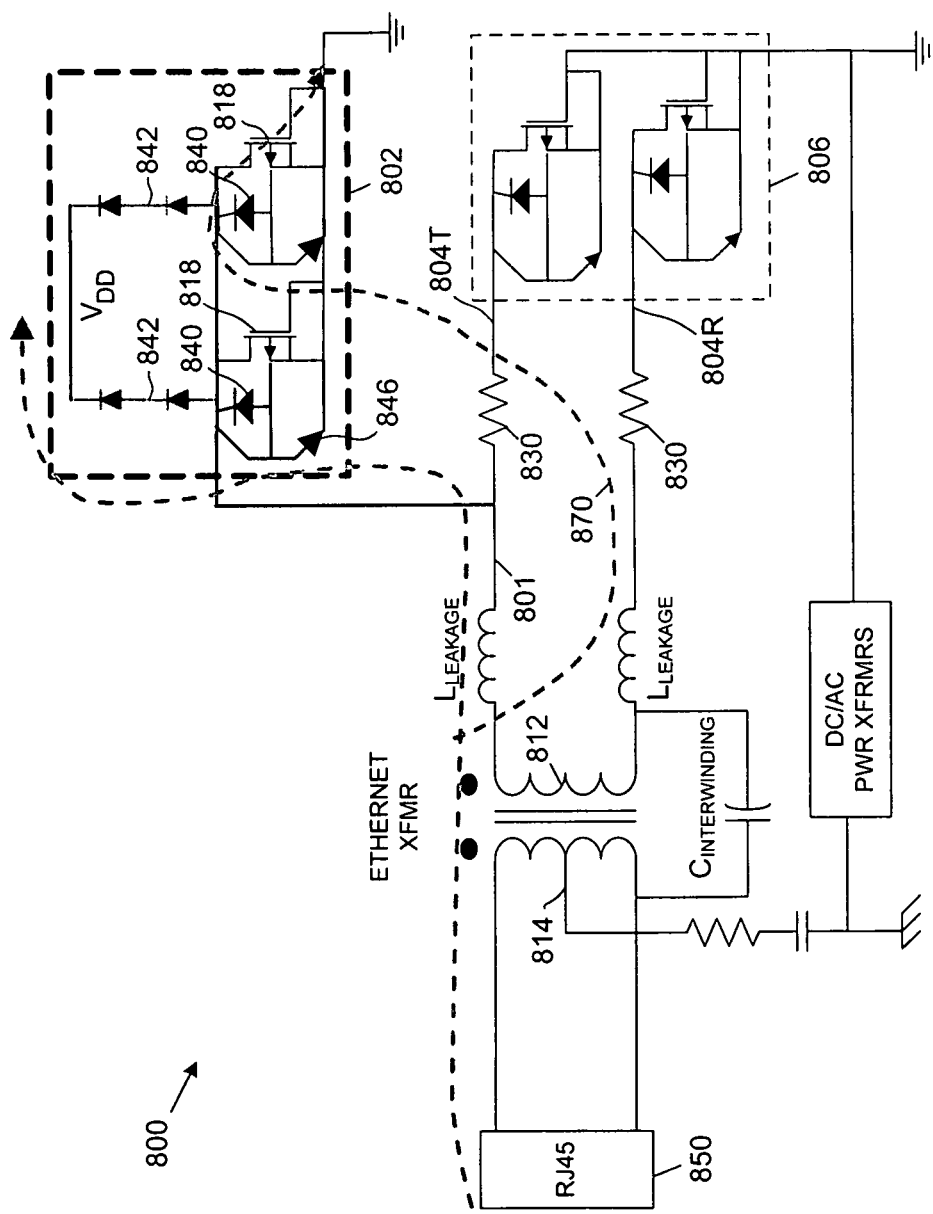
FIG. 8 is a schematic block diagram showing an embodiment of a network device configured for protection against ESD strike events.

The integrated electrostatic discharge protection circuit 302 can be configured in an example embodiment as depicted in FIG. 8 comprising first and second control transistors 818 respectively coupled to the differential signal lines 804T, 804R and coupled in parallel to a supply line $V_{DD}$ by respective protection diodes 840 configured for reduced capacitive loading and reduced inductive behavior. The integrated electrostatic discharge protection circuit 302 can further comprise respective diode stacks 842 coupled between the diodes of the control transistors 818 and the supply line $V_{DD}$. The diode stacks 842 are configured to attenuate positive electrostatic discharge (ESD) strikes. In some embodiments, the integrated electrostatic discharge protection circuit 302 can also include output N-channel metal oxide semiconductor (NMOS) bulk diodes coupled between the respective first and second control transistors and ground and configured to attenuate negative electrostatic discharge (ESD) strikes.

FIG. 3 shows system noise coupling paths for emissions that may arise in the network device 300. The network device 300 comprises the integrated active EMI suppression and ESD protection circuit 302 that is configured to absorb common mode noise by forming a low impedance path from an output terminal of an electronic device 306, for example an Ethernet Physical layer (PHY) module, to ground. An Ethernet PHY module 306 has an output common mode level of the Ethernet PHY module 306 can vary up to $V_{CC}$. The output load condition is highly variable. Thus, the choke and ESD protection circuit 302 is configured for suitable performance in the megahertz to gigahertz range. Pin wires, supply inductors, and parasitic capacitances all may form noise coupling paths to be addressed by the shunt choke and ESD protection circuit 302.

Figure 12:
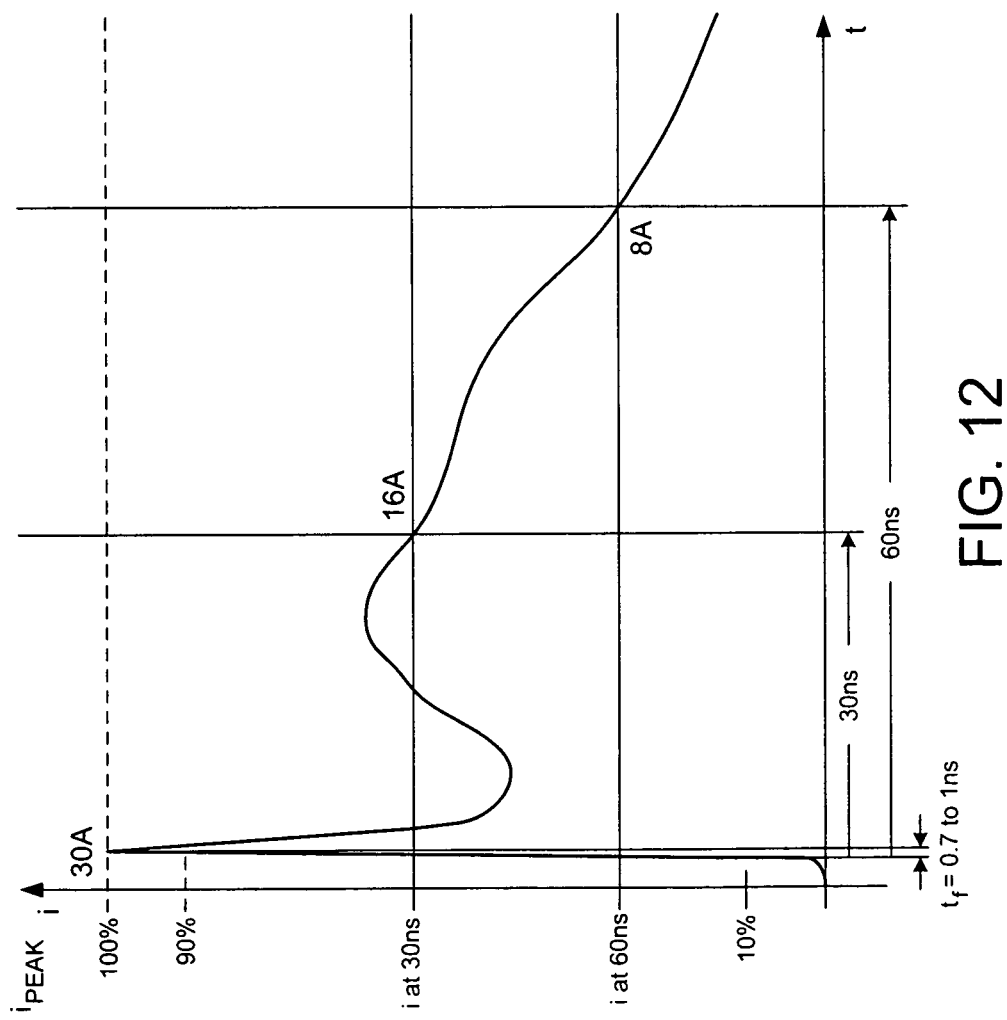
FIG. 12 is a graph showing an example of a typical ESD current waveform.

For a differential strike some current flows through the transformer 312, through the transformer's air core, and out the transformer 312. In common-mode strikes, the transformer 312 is the first level of protection. The integrated active EMI suppression and ESD protection circuit 302 imparts protection against differential strikes and common-mode strikes. Differential strikes occur at one pin of the network connector 350 at a time, forming energy spikes that pass through the transformer 312 and are the most difficult strikes to protect against. Other differential strikes include contact and air discharge strikes, cable discharge equivalent strikes, and direct chip electrostatic discharge (ESD). Common-mode strikes are addressed by a first level of protection, a relatively good level of protection, by isolation in an Ethernet transformer 312. Transformer interwinding capacitance $C_{INTERWINDING}$ limits transfer of energy to the PHY 306. Other common-mode strikes include electromagnetic reverberation (EFTB) and surge strikes. The network device 300 is shown with a generalized stressing circuit 352. All stresses have circuit use capacitive storage devices to set an energy level event. Total charge CV is a measure of the energy event. A series resistance $R_{CL}$ limits the peak current of the event. The higher the peak current, the more stress, specifically thermal stress, which is created. An additional network $Z_{SHAPE}$ can be used to shape the pulse, for example by controlling the form of a rising edge of the strike signal waveform, for example as shown in FIG. 12. The faster the rising edge, the greater the created stress. Strikes can pass in both directions.

Arrows are superimposed on FIG. 3 showing possible sources of common mode noise. Noise can possibly propagate from the $V_{CC}$ power supply path 340, from the ground path 342, and from the electronic device 344. The choke shunt and ESD protection circuit 302 reduces or minimizes noise sources 346 through the center tap of the transformer, and noise 348 from ground. The choke shunt and ESD protection circuit 302 also addresses noise 344 from the device. For example, noise 344 from the PHY 306 can be the greatest noise source, including clock frequency and clock noise that is switched out through the device 306, and the most important noise to suppress. The function of the choke and ESD protection circuit 302 is to operate as a noise absorber that chokes common mode noise and prevents transmission of common mode noise to the Ethernet twisted pair cable that in turn becomes electromagnetic interference (EMI) emission. The shunt choke and ESD protection circuit 302 absorbs the common mode noise by forming a very low impedance path from the Ethernet PHY output terminals to ground so that any common mode noise follows a path of least resistance through the choke and ESD protection circuit 302 to ground, thereby diverting the noise from the signal line. Supply $V_{CC}$ is typically a dominant source of noise, although the noise sourced in relatively variable.

The shunt choke and ESD protection circuit 302 can be designed by taking into consideration what noise sources are present, locations of the noise paths, and characteristics, source impedances and worst case conditions of the noise sources.

Figure 4:
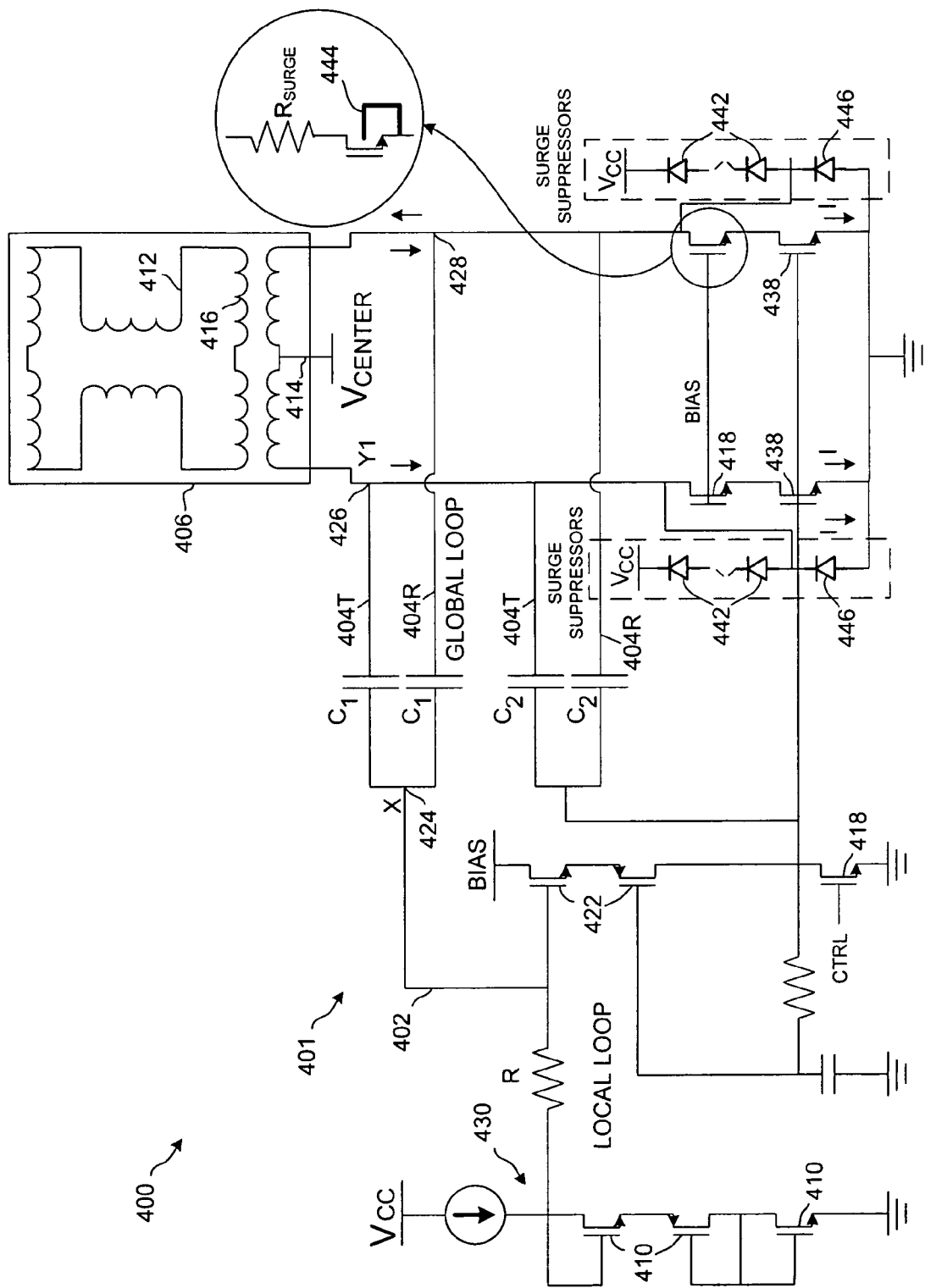
FIG. 4 is a schematic circuit diagram showing an example embodiment of an integrated active EMI suppression and ESD protection circuit that can be used in a network device such as the network device depicted in FIG. 1.

Referring to FIG. 4, a schematic circuit diagram depicts an example embodiment of an integrated active common mode suppression and electrostatic discharge protection circuit 402 that can be used in a network device such as the network device 406 depicted in FIG. 1. The illustrative integrated active common mode suppression and electrostatic discharge protection circuit 402 comprises first and second control transistors 418 respectively coupled to the differential signal lines 404T, 404R and coupled in parallel to a supply line $V_{DD}$ by respective protection diodes 440 configured for reduced capacitive loading and reduced inductive behavior. The protection diodes 440 can be configured for reduced inductive behavior under strong forward bias.

Referring to an insert to FIG. 4, in some embodiments the control transistors 418 can each be constructed using a surge capable design to enhance surge protection by inclusion of ballast resistors ($R_{surge}$) connected in series with the control transistors 418 and including a tie 444 for transistor device toughening. Low inductive ESD protection diodes 840 are shown at the lower portion of the integrated active EMI suppression and ESD protection circuit 802 while the upper portion of the circuit 802 has a diode stack 842. The stack 842 typically includes one, two, or three diodes depending on the supplies in the system, although any suitable number of diodes may be used. Diodes, if arranged suitably, are highly suitable for surge protection and can be formed as part of an integrated circuit in standard complementary metal oxide semiconductor (CMOS). Devices 418 and 438 can be configured in a surge capable design wherein a surge resistance $R_{surge}$ is coupled as a ballast resistance in series with the transistor or device 418, 438. Additional toughening can be added to the devices 418, 438 to ensure that each stripe of devices is laid out individually with some internal series resistance. Furthermore, some bulk tie to the devices 418, 438 can be implemented whereby interdigitated devices with many bulk ties can be formed to stiffen the devices so that snapback voltage is higher, assisting ESD performance of the diode, although the diodes are typically the fundamental determinant of ESD effectiveness.

The illustrative integrated active common mode suppression and electrostatic discharge protection circuit 402 comprises first and second control transistors 418 respectively coupled to the differential signal lines 404T, 404R and coupled in parallel to a supply line $V_{DD}$ by respective protection diodes 440 which are configured for reduced capacitive loading and reduced inductive behavior. The integrated active common mode suppression and electrostatic discharge protection circuit 402 further comprise one or more active output devices 410 coupled to an interface 401 and a transformer 412 coupled to the electronic device 406. The transformer 412 comprises a center tap 414 and windings 416. The integrated active common mode suppression and electrostatic discharge protection circuit 402 is configured to draw power from the active output devices 410 through the center tap 414 of the transformer 412.

In an illustrative embodiment, the integrated active common mode suppression and electrostatic discharge protection circuit 402 is configured to reduce electromagnetic interference (EMI) noise related in part to common mode noise through the transformer 412. The active common mode suppression and electrostatic discharge protection circuit 402 can also be configured to reduce common mode impedance and short-circuit common-mode energy to system ground.

In some embodiments, the integrated active common mode suppression and electrostatic discharge protection circuit 402 can comprise control transistors 418 coupled to the differential signal lines 404T, 404R and coupled in parallel to a supply line $V_{DD}$ by protection diodes 440 configured for reduced capacitive loading and reduced inductive behavior, in combination with a high-bandwidth AC-coupled feedback loop that is stable when connected to the transformer 412 and draws a predetermined amount of current unless a common mode disturbance occurs at a frequency that is higher than a predetermined normal range of frequencies. The feedback loop is controlled to respond to the common mode disturbance with negative feedback that suppresses the disturbance. AC-coupling feedback is useful because feedback control does not depend on the DC value of the network lines, for example RJ-45 lines so the circuit can operate with different DC bias conditions on the (RJ-45) line.

The integrated active common mode suppression and electrostatic discharge protection circuit 402 can include control devices 418 that enable programmable adjustment for managing both EMI suppression and ESD protection behavior. The illustrative network device 400 implements a shunt technique for EMI suppression that improves differential to common mode conversion and improves EMI suppression performance. The integrated active common mode suppression and electrostatic discharge protection circuit 402 suppresses common mode noise generated as a result of differential-to-common mode conversion due to transformer imperfections.

In some embodiments, the integrated active common mode suppression and electrostatic discharge protection circuit 402 can comprise first and second control transistors 418 respectively coupled to the differential signal lines 404T, 404R and coupled in parallel to a supply line $V_{DD}$ by respective protection diodes 440 which are configured for reduced capacitive loading and reduced inductive behavior, in combination with a differential amplifier 422 that that performs alternative current (AC) coupling sensing and controls driving of signals onto a differential pair of signal lines 404T, 404R through a center tap 414 of an Ethernet transformer 412, enabling toleration of a wide differential signal swing. The differential amplifier 422 can be configured to perform AC coupling sensing and control driving of signals onto the differential pair 404T, 404R through the center tap 414 of the Ethernet transformer 412 for current absorption and noise immunity.

Power is drawn power from active common mode suppression and electrostatic discharge protection circuit output devices 438 that drive signals onto the differential pair of signal lines 404T, 404R through a center tap 414 of an Ethernet transformer 412 whereby common mode impedance is reduced.

The illustrative common mode suppression and electrostatic discharge protection circuit 402 includes a differential amplifier 422 and performs alternative current (AC) coupling sensing at a point X 424. Capacitors C1 are used to perform AC sensing. In a particular embodiment the capacitors C1 can be 0.5 pF capacitors, although any suitable capacitance can be implemented according to typical circuit design constraints. The common mode suppression and electrostatic discharge protection circuit 402 operates as a common mode circuit whereby when the transformer 412 is in a direct current (DC) condition, the circuit 402 has no gain because inductors are in a short-circuit condition. The capacitors C1 are selected for suitable performance in sensing common mode current.

The integrated active EMI suppression and ESD protection circuit 402 has capacitors C1 that define a center point at point X 424 enabling differential tracking of common mode current. Differential tracking operates so that when two nodes Y1 426 and Y2 428 move up and down in opposite directions during operation, the node X 424 does not move. In contrast, when the two nodes Y1 426 and Y2 428 move in the same direction, then node X 424 moves and generates a feedback signal. The integrated active EMI suppression and ESD protection circuit 402 is configured so that at a DC condition, a bias circuit 430 in a bias loop sets an output stage 434 to draw a fixed amount of current i, which defines a bias point and enables setting of the capacity of the integrated active EMI suppression and ESD protection circuit 402 to suppress common mode noise. The integrated active EMI suppression and ESD protection circuit 402 is formed taking into consideration two component parameters, loop gain and base output impedance of the active output devices 410. The global loop draws a predetermined amount of current unless a common mode disturbance occurs at a frequency that is higher than a predetermined normal range of frequencies. If voltage at both active output devices 410 increases, then current at the node X 424 begins increase and the feedback loop attempts to suppress the current increase at node X 424 and through operation of the local loop a transient event is created on the gated output devices 410. The feedback loop operates with negative feedback which suppresses the current increase at node X 424. The illustrative feedback loop is simple and fast, thereby improving feedback loop performance. Capacitors C2 supply Miller compensation. Accordingly, capacitors C1 capacitors are used for common mode sensing and capacitors C2 enable Miller compensation.

The integrated active EMI suppression and ESD protection circuit 402 effectively functions as a two-stage operational amplifier, operational as a common mode amplifier, except a differential pair is not implemented. The illustrative integrated active EMI suppression and ESD protection circuit 402 operates in the manner of a common mode amplifier that has a single transistor wherein the circuit responds to disturbances in the common mode and attempts to prevent the disturbances from occurring. The local loop ensures correct DC biasing and responds quickly to disturbances. The integrated active EMI suppression and ESD protection circuit 402 remains quiescent with the node X 424 stable, drawing a fixed amount of current from the output load which is drawn through the transformer 412, until a disturbance occurs. The integrated active EMI suppression and ESD protection circuit 402 operates as an AC-coupled loop wherein no feedback is present when the transformer 412 is at DC. The integrated active EMI suppression and ESD protection circuit 402 can be configured with high differential impedance while maintaining low common mode impedance over a predetermined range of frequencies and functions as an active shunt choke and thus on the basis of active control enables solution of EMI problems without usage of magnetic devices. In contrast, conventional techniques for handling EMI use magnetics for implementing a series choke device which have the disadvantage of introducing problematic parasitics for very high speed applications, and are also highly expensive and physically large. Thus, the illustrative integrated active EMI suppression and ESD protection circuit 402 enables production of a smaller device and, by virtue of implementation as an active circuit, enables improved differential signal performance. Shunt choke behavior can be implemented inside a device that is a separate block from the interface, for example as a common-mode feedback loop inside an operational amplifier. However, an integrated circuit including a closed loop amplifier design is difficult to attain that has the bandwidth achieved using the shunt choke 402 and also has capability to perform differential signaling. In contrast, the illustrative embodiment the shunt choke 402 is implemented outside and separated from the device 406 thereby improving performance. For example, implementing the shunt choke 402 separate from the device 406 enables usage of resistors to enable matching of the impedance of the differential signal. Also, the configuration of the shunt choke 402 separate from the device 406 produces a better high-frequency signal because the device 406 is physically separated from the interface 401 by some real inductance, minimizing the effect of the series choke. The feedback loop functions as a high-speed common mode feedback loop that suppresses common mode noise that is generated by current that is steered into a device 406, such as an Ethernet PHY, and into the transformer 412. Inductors in the transformer 412 provide current loading as current is steered out of the PHY which, in the absence of the feedback loop, would otherwise generate undesirable common mode noise.

Referring to FIG. 1 in combination with FIG. 8, the integrated active common mode suppression and ESD protection circuit 102, 802 can be formed with diode stacks 842 coupled between the protection diodes 840 of the first and second control transistors 818 and the supply line $V_{DD}$ and configured to attenuate positive electrostatic discharge (ESD) strikes.

In some embodiments, output N-channel metal oxide semiconductor (NMOS) bulk diodes 846 coupled between the respective first and second control transistors 818 and ground and configured to attenuate negative electrostatic discharge (ESD) strikes.

The first and second control transistors 818 can be configured to prevent snapback of N-channel metal oxide semiconductor (NMOS) in the integrated active common mode suppression and ESD protection circuit and the electronic device 802.

The electronic device 100, 800 can further comprise first and second resistors 830 respectively coupled to the differential lines 804T, 804R between the integrated active common mode suppression and electrostatic discharge protection circuit 802 and the electronic device 806.

In the illustrative embodiment, the network device 800 further comprises a transformer 812 comprising a primary winding 816P coupled to receive input signals from a network connector 850 and a secondary winding 816S coupled to supply data signals to an electronic device 806 on a differential pair of signal lines 804T, 804R. Diode stacks 842 are coupled between the protection diodes 840 of the first and second control transistors 818 and the supply line $V_{DD}$ and are configured to prevent the transformer 812 from turning on in a condition that the electronic device 806 voltage swings beyond the supply line voltage $V_{DD}$.

Referring to FIG. 5A, a pictorial diagram illustrates an embodiment of a network device 500 comprising an integrated circuit (IC) package 510. The IC package 510 includes multiple integrated circuit (IC) pins 512 coupled to an integrated active mode suppression and electrostatic discharge (ESD) circuit 502 and is arranged as at least one differential pin set 514A, 514B each comprising a negative power pin ($V_{SS}$), first and second differential transmit and receive line pins for coupling to the transmit and receive differential signal lines, and a power pin ($V_{CC}$).

The IC package 510 can be configured for programmable adjustment of the integrated active common mode suppression and electrostatic discharge (ESD) protection circuit 502.

For example, the IC package 510 can be, as shown, a Quarter-size Small-Outline (QSOP) package 510 comprising multiple pins 512 arranged as first 514A and second 514B differential pin sets. Each pin set has a negative power pad ($V_{SSA}$), first (TRDnA) and second (TRDnA) differential transmit and receive line pins for coupling to the transmit and receive differential signal lines, and a power pin ($V_{CCA}$) for pin sets n=1, and n=2. Additional pins can include a power down pin (PWDN) pin, an output current gain (HGM) pin, and a global loop bandwidth (HBW) pin. The PWDN pin can be used for chip power down, as a test mode enable pin, and in a default mode designating that both channels are active. The HGM pin sets output stage current. The HBW pin sets global loop bandwidth. A standard QSOP IC package has a pin spacing of 0.635 mm.

The illustrative package shape and orientation are small and user-friendly for printed circuit board (PCB) layout for applications such as power-over-Ethernet (Poe) applications.

The pins 512 and common mode suppression and electrostatic discharge protection circuit are configured to enable programmable control. In contrast, a standard choking scheme that is implemented using a magnetic device has an active choke functionality that is determined by characteristics of the magnetic device. An end user has no capability to change functionality other than to physically change the magnetic device. In contrast, the illustrative network device has a soft or programmable capability to adjust choking of the device. Accordingly, the illustrative network device 500 has an active choke functionality that differs from a passive choke by virtue of programmability and changeability that enable a user or customer to trade-off power for noise suppression. The active choke functionality enables increased flexibility once the device is produced or manufactured. If the device is in production and a problem or possible is found, software can be changed to fix the emission problem or improve functionality, as opposed to physically changing hardware.

In the illustrative example, the network device 500 includes a circuit that does not supply a driving functionality but does include two interfaces that have a differential line and draw power from a supply while spreading common mode noise.

The network device 500 thus includes an interface for a differential pair of signals, which includes pins for differential signaling except that functionality is open circuit to differential. The circuit does not affect the differential, but only affects common mode.

In other embodiments, various numbers of communication ports can be implemented. A single communication port can be implemented, for example a discrete configuration or a single-port MagJack integration. Other implementations can include multiple communication ports, for example a multi-port extension in switch systems in either discreet or MagJack integrated configurations.

The pin interface for the network device 500 and the IC package 510 is used in combination with the common mode suppression and electrostatic discharge (ESD) protection circuit 502 or active choke implemented in the IC package 510. Each pin set 514A, 514B includes four pins 512 with two power pins and a pair of pins for differential signals that are connected to an active choke that suppresses electromagnetic interference (EMI).

The IC package 510 contains the integrated active common mode suppression and electrostatic discharge protection circuit 502 which functions as a shunt choke and includes one or more channels, each including differential lines and a power device that creates the shunt choke.

Figure 5B:
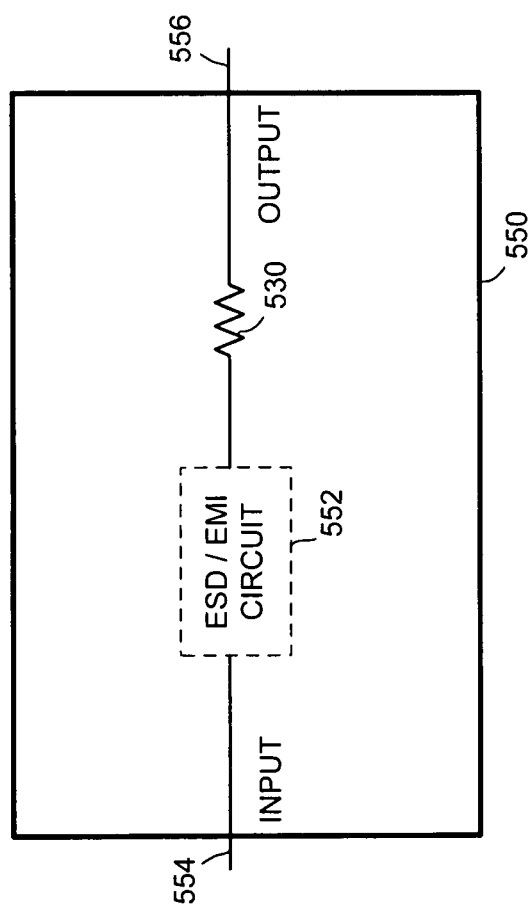

FIG. 5B depicts an integrated circuit package 550 comprising an ESD/EMI suppressor 552 and resistors 530 integrated into the device. The integrated circuit 550 has input 554 and output 556 pins. The input pin 554 is connected to the ESD/EMI suppressor 552 and the resistor 530, for example a low-valued resistor, is connected to the output pin 556. The integrate circuit 550 thus can be implemented with an integrated resistor 530.

Figure 6:
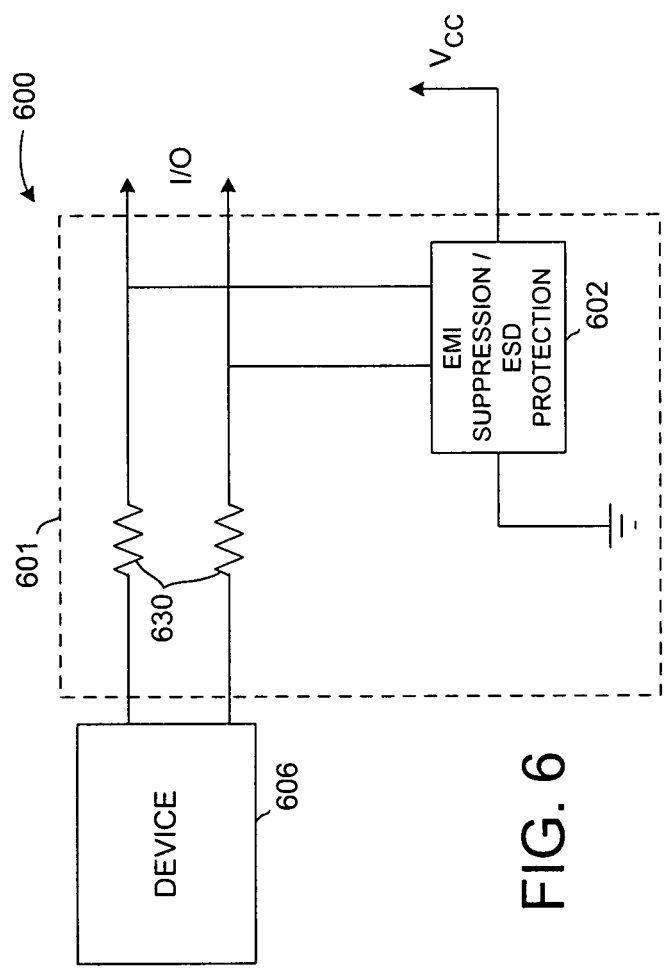
FIG. 6 is a schematic block diagram depicts another embodiment of a network device that implements active electromagnetic interference (EMI) suppression and ESD protection.

Referring to FIG. 6, a schematic block diagram depicts another embodiment of a network device 600 that implements active electromagnetic interference (EMI) suppression and electrostatic discharge (ESD) protection. The network device 600 comprises an integrated active common mode suppression and electrostatic discharge (ESD) protection circuit 602 coupled in parallel to a differential pair of signal lines 604T, 604R coupled to an electronic device 606 in which the active common mode suppression and electrostatic discharge protection circuit 602 is configured for programmable adjustment.

The integrated active common mode suppression and electrostatic discharge protection circuit 602 can comprise a high-bandwidth AC-coupled feedback loop that is stable when connected to a transformer. The illustrative device 600 is an example embodiment that does not have a transformer coupling to the line, such as would be the case for a Universal Serial Bus (USB) line. FIG. 6 illustrates that the common-mode suppression technique can be applied to any differential signal system in which EMI could be a problem. The active choke enables a much improved low and mid-band suppression than can be attained through use of magnetic chokes. A suitably designed common mode suppression and electrostatic discharge protection circuit or shunt choke can achieve a common-mode rejection that exceeds 60 dB, a far better performance than can be attained using magnetics.

The illustrative network device 600 is shown further comprising resistors 630, typically small, low-cost components that can improve EMI filtering performance. The resistors 630 and impedance of the choke 602 can be selected to create a very good high-frequency EMI filter in addition to the lower frequency, mid-band frequency performance that the shunt choke 602 alone can produce. The interface 601, including resistors 630 and the shunt choke 602, uses the resistors 630 and impedance to tune out capacitive loading that is created. Although an ideal differential load cannot be attained, the interface 601 does present some capacitive load generally on the circuit. The resistor 630 is selected to mitigate detrimental impedance effects. For high-speed differential signaling applications, capacitive loading causes impedance looking into the device to be skewed, causing distortion in the received signal. Addition of resistors 630 to the circuit can correct the impedance level and ensure maximum power transfer. Thus, the resistors 630 can be implemented to address loading that is presented with a series choke. In some embodiments, the resistors 630 can be used with a protection circuit with ESD protection functionality but without EMI suppression, if desired.

Figure 7:
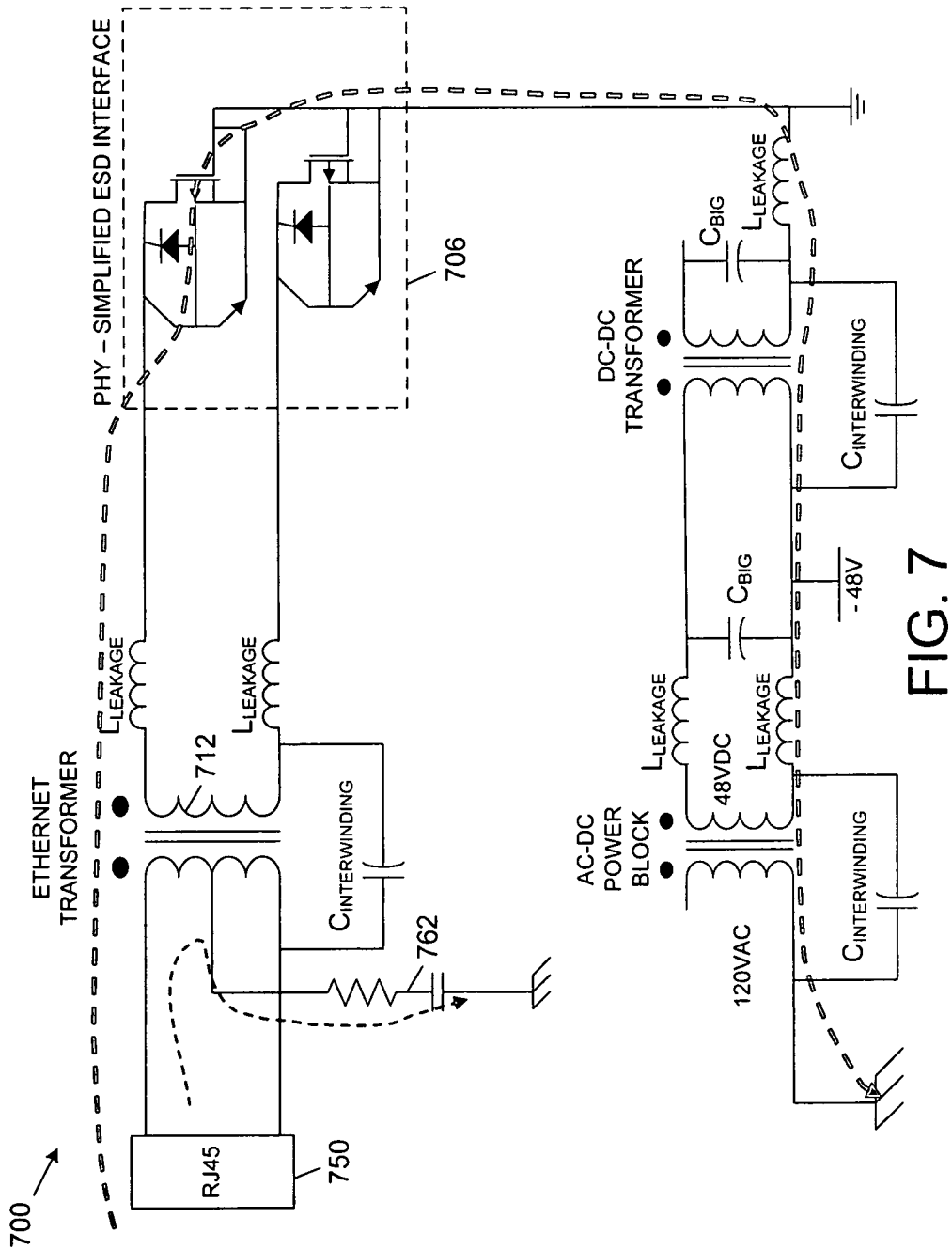
FIG. 7 is a schematic block diagram illustrating a block diagram showing current flow paths in an embodiment of a network device that includes an integrated active EMI suppression and ESD protection circuit.

Referring to FIG. 7, a schematic block diagram illustrates a block diagram showing current flow paths in an embodiment of a network device 700. For differential strikes and electrostatic discharge (ESD) strike to any pin of a network connector 750 such as an RJ-45 connector at one time can create energy such as differential energy. The transformer core 712 quickly saturates. The ESD strike is coupled to the PHY side of the device 706 via air-core inductance and inter-winding capacitance $C_{INTERWINDING}$. A I/O metal oxide semiconductor (MOS) devices in the PHY 706 go into a snapback mode in response to the ESD event, creating a short-circuit to ground and forming an ESD energy path back to earth ground. Line side Bill Smith Termination (BST) also creates a path back to earth ground, preventing a large voltage from forming across the transformer 712.

FIG. 7 illustrates energy paths of ESD strikes. A differential ESD strike on an RJ-45 connector pin creates an energy path through the transformer 712 and that either passes through the inner winding capacitance to the transformer 712 or to ground. For a strike through the transformer 712, the transformer 712 saturates but has an air core transformer effect, even with core saturation. The current is typically sufficiently high that energy continues past the transformer 712 so that the PHY 706 snaps back and the energy flows through close to the PHY 706 and eventually passes through system earth ground. Some strike energy passes through a resistor-capacitor termination circuit 762, for example a Bob Smith termination as described in U.S. Pat. No. 5,321,372.

Referring to FIG. 8, a schematic block diagram illustrates an embodiment of a network device 800 configured for protection against ESD strike events, showing current flow and a configuration of resistors 830. The illustrative network device 800 comprises an interface 801 coupled in parallel to differential signal lines 804T, 804R connecting an electronic device 806 and a differential pair operative at a voltage substantially higher than the voltage of the electronic device 806. The interface 801 is coupled to an Ethernet transformer 812 and comprises an integrated active common mode suppression and electrostatic discharge protection circuit 802 that protects against transient spikes for differential and common-mode electrostatic discharge (ESD) events by shunting transient energy to ground using protection diodes 840 configured for reduced capacitive loading and reduced inductive behavior, and reduces common mode impedance by drawing power through a center tap 814 of the Ethernet transformer 812. The interface 801 further comprises resistors 830 coupled in series to the differential signal lines 804T, 804R that slow energy passing to the electronic device 806, enabling shunting of the energy to ground.

The integrated active EMI suppression and ESD protection circuit 802 gives PHY side ESD protection. In an illustrative embodiment the integrated active EMI suppression and ESD protection circuit 802 can be an all-CMOS design and can be based upon design and layout techniques for low capacitive loading and low inductive effects in protection diodes 840. Positive strikes can be handled by additional diodes 842, and negative strikes handled by output NMOS bulk diodes 846, preventing snapback of output NMOS both in the integrated active EMI suppression and ESD protection circuit 802 and in the electronic device 806, for example an Ethernet PHY in some embodiments. The ESD protection configuration depicted in the network device 800 addresses both differential and common-mode strikes. Current flow 870 through the local integrated protection diodes 840 is shown. The protection diodes 840 are connected in parallel with the electronic device 806, for example physical layer (PHY), and thus have limited ability to protect the device 806 since protection depends on the speed at which the protection diodes 840 turn on. Accordingly, surge protection is facilitated by usage of the resistors 830 as series surge elements. Inclusion of the resistors 830, although optional in various surge protection embodiments, enables improved ESD protection.

The illustrative configuration of series-connected resistors 830 is distinguishable from parallel resistor elements which saturates and resonates a load capacitance of surge protector devices. The illustrative series-connected resistors 830 reduce the impedance effect while still maintaining Ethernet performance. Diode stacks 842 are inserted up to the positive rail. The Illustration shows a stack 842 of two diodes, although three diodes or any suitable number of diodes can be implemented in a stack. The diode stacks 842 are inserted to prevent the transformer 812 from turning on if the PHY 806 swings beyond the high rail. In addition, diode protection 840 is included beyond diodes inserted for usage in EMI suppression.

Figure 9:
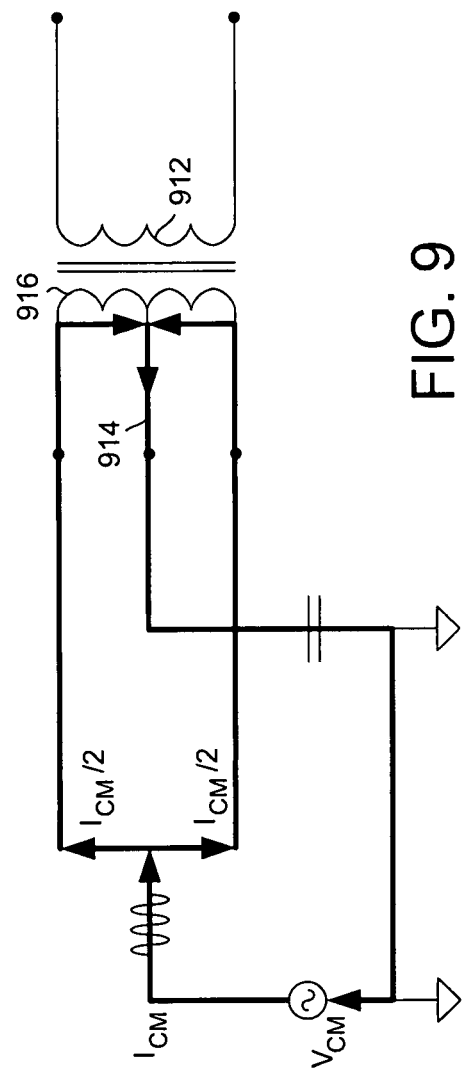
FIG. 9 is a circuit diagram illustrating a theory of operation of a transformer with an ideal center tap that operates in accordance with the integrated active EMI suppression and ESD protection circuits depicted in FIGS. 1 through 8.
Figure 10B:
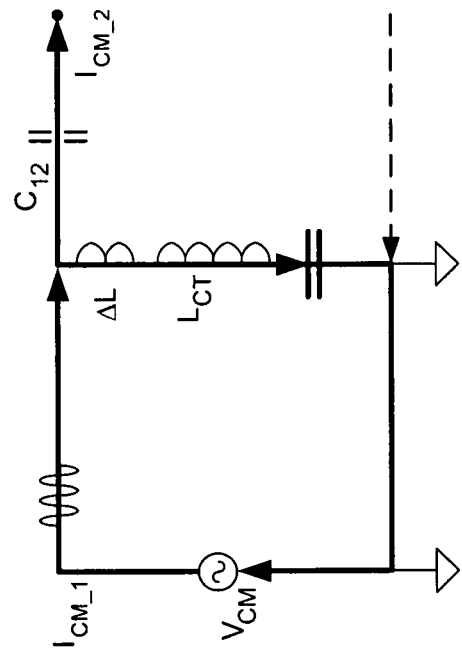
FIGS. 10A and 10B are respectively a circuit diagram and an equivalent common-mode model illustrating the theory of operation of a transformer with a non-ideal center tap.
Figure 10A:
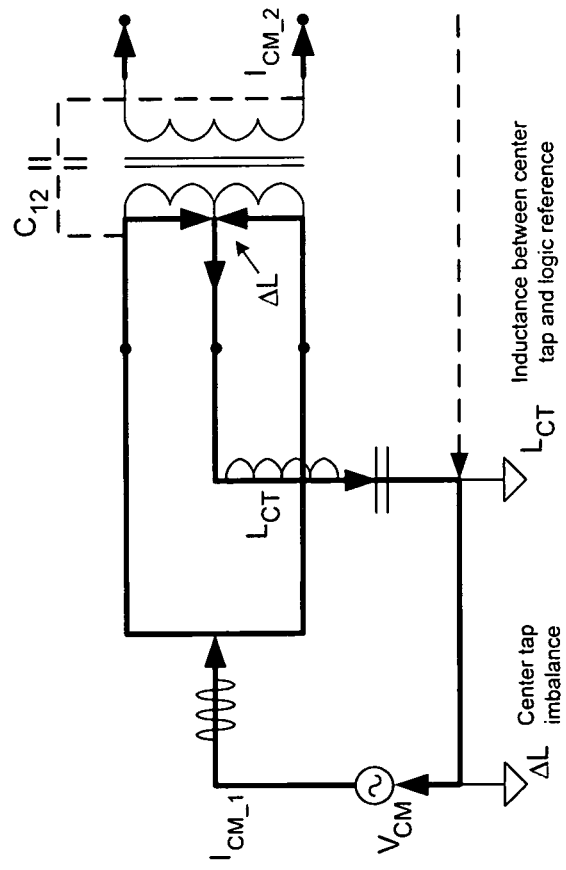

FIGS. 9, 10A, and 10B illustrate theory of common-mode to differential balancing. Referring to FIG. 9, a circuit diagram illustrates the theory of operation of a transformer 912 with an ideal center tap 914 that operates in accordance with the integrated active EMI suppression and ESD protection circuits depicted in for implementation in the various embodiments of network devices shown herein. All current-mode current flows through the center tap 914 back to the source. Center taps 914 provide attenuation of common-mode currents and voltages on cables by forming a low-impedance return path to the source for common mode currents on differential pairs. The center taps 914 also provide DC bias for differential pairs or a power source for transmit output in some transceivers.

Each half of the winding 916 carries half the common-mode current $I_{CM}$ flowing in opposing directions. The resulting magnetic flux in the transformer core is zero.

In contrast FIGS. 10A and 10B are respectively a circuit diagram and an equivalent common-mode model illustrating the theory of operation of a transformer with a non-ideal center tap. Center tap inductance ($L_{CT}$), delta inductance ($\Delta L$), and capacitance $C_{12}$ decrease common-mode attenuation. $\Delta L$ is center tap imbalance that creates differential mode (DM) to common-mode (CM) conversion. $L_{CT}$ is the inductance between the center tap and the logic reference. CM voltage exists on the center tap because $\Delta L$ plus $L_{CT}$ is not equal to zero. CT voltage drives CM current on the cable, which causes emission.

Figure 11B:
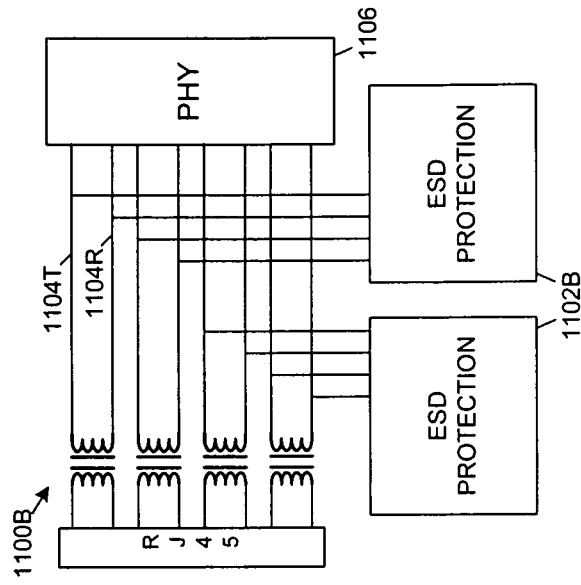
FIGS. 11A and 11B are schematic block and circuit diagrams depicting respective embodiments of a network device with EMI suppression and ESD protection, and a network device with ESD protection alone.
Figure 11A:
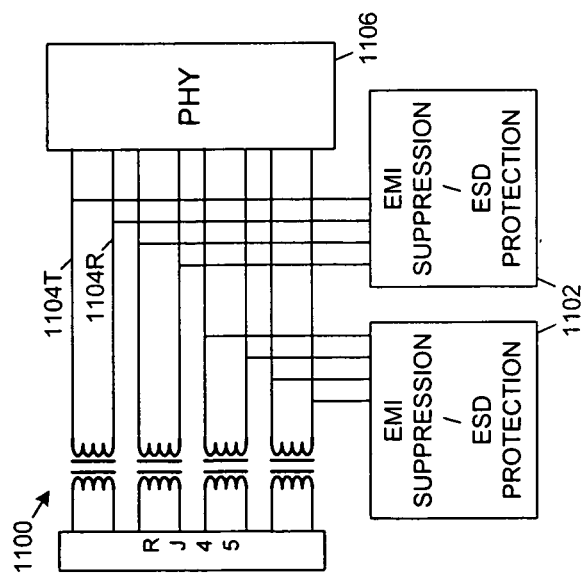

Referring to FIG. 11A, a schematic block and circuit diagram depicts an embodiment of a network device 1100 with EMI suppression and ESD protection, showing placement of one or more integrated active EMI suppression and ESD protection circuits 1102 in the device 1100. The network device 1100 comprises the integrated active common mode suppression and electrostatic discharge protection circuit 1102 coupled in parallel to a differential pair of signal lines 1104T, 1104R coupled to an electronic device 1100. In some embodiments, the integrated active EMI suppression and ESD protection circuit 1102 can be configured for programmable adjustment.

The network device 1100 includes a shunt device 1102 connected in parallel with an Ethernet PHY 1106. A 10/100Base-T Ethernet embodiment can be implemented with a single integrated active EMI suppression and ESD protection circuit 1102. A gigabit Ethernet (GbE) embodiment typically uses two integrated active EMI suppression and ESD protection circuits 1102. The network device 1100 can be implemented in combination with a power over Ethernet (PoE) system or can be used in general Ethernet applications which are not specific to PoE.

Various network device implementations can exploit several advantageous aspects of the integrated active EMI suppression and ESD protection circuit 1102, for example to increase the level of standards compliance in a system. For example, the integrated active EMI suppression and ESD protection circuit 1102 improves ElectroMagnetic Compatability (EMC) robustness, can decrease development time, and can eliminate usage of external protection diodes.

The integrated active EMI suppression and ESD protection circuit 1102 can be implemented to enable system designers to attain consistent margin against EMI Class B specifications, enable transition from Class A compliant equipment to Class B compliant equipment, and can reduce the effect of manufacturing variances, for example in transformers and circuit boards, on EMI.

The integrated active EMI suppression and ESD protection circuit 1102 can also be implemented to enable system designers to target the highest levels, for example level 4, of ESD compliance without usage of external protection diodes. In some Ethernet configurations, the integrated active EMI suppression and ESD protection circuit 1102 can be used to protect lower geometry Ethernet PHYs.

The integrated active EMI suppression and ESD protection circuit 1102 can be exploited to reduce development cycle time with a reduced number of board design iterations and reduced time in compliance testing, resulting in development time savings. The integrated active EMI suppression and ESD protection circuit 1102 also enables robust designs that increase front-end design usage.

The integrated active EMI suppression and ESD protection circuit 1102 enables a higher level of EMI compliance over conventional technologies. For example with regard to conducted immunity standards defined by International Electrotechnical Commission (IEC) 61000-4-6, requirements set by ITE (Information Technology Equipment) and TNE (Telemar Norte Leste, S.A.) for 150 kHz-80 MHz are level2: $3V_{rms}$, 80% 1 kHz AM. The integrated active EMI suppression and ESD protection circuit 1102 can improve performance for 150 kHz-80 MHz to level 3: $10V_{rms}$, 80% 1 kHz AM, where $10V_{rms} \rightarrow 24V_{pp}$.

With regard to radiated immunity standards defined by IEC 61000-4-3, requirements set by ITE and TNE for 80-1000 MHz are 3V/m, 80% 1 kHz AM; and for 800-960 MHz, 1.4-2.0 GHz are 10V/m, 80% 1 kHz AM. The integrated active EMI suppression and ESD protection circuit 1102 can improve performance for 80-2000 MHz to 10V/m, 80% 1 kHz AM.

With regard to conducted emissions standards defined by Special International Committee on Radio Interference (CISPR) 22 requirements set by ITE and TNE are Class A, 0.15-0.5 MHz: 97-87 $dB_\mu V$ (QP); 0.5-30 MHz: 87 $dB_\mu V$ (QP), and Class B, 0.15-0.5 MHz: 87-74 $dB_\mu V$ (QP); 0.5-30 MHz: 74 $dB_\mu V$ (QP). The integrated active EMI suppression and ESD protection circuit 1102 can improve performance to Class B, 0.15-0.5 MHz: 87-74 $dB_\mu V$ (QP); 0.5-30 MHz: 74 $dB_\mu V$ (QP).

With regard to radiated emissions standards defined by CISPR 22 requirements set by ITE and TNE are Class A, 30-230 MHz: 40 dB ($\mu$V/m, QP); 230-1000 MHz: 47 dB ($\mu$V/m, QP), and Class B, 30-230 MHz: 30 dB ($\mu$V/m, QP);

230-2000 MHz: 37 dB (μV/m, QP). The integrated active EMI suppression and ESD protection circuit 1102 can improve performance to Class B, 30-230 MHz: 30 dB (μV/m, QP); 230-2000 MHz: 37 dB (μV/m, QP).

The integrated active EMI suppression and ESD protection circuit 1102 also enables increased ESD protection target levels over conventional technologies. For example with regard to cable discharge equivalent (CDE) standards, requirements set by ITE and TNE are 6 kV for industry standard operation and 8 kV for industry leaders. The integrated active EMI suppression and ESD protection circuit 1102 can improve performance to a target of more than 12 kV, and have shown improvements on the order of 7 kV in testing of implementations with MagJack and Broadcom gigabit PHY.

With regard to ESD target standards defined by IEC 61000-4-2, requirements set by ITE and TNE are ±6 kV for contact discharge and ±8 kV for air discharge at a level 3 industry standard, and +8 kV for contact discharge and ±15 kV for air discharge at a level 4 for industry leaders. The integrated active EMI suppression and ESD protection circuit 1102 can improve performance to a target of more than ±25 kV for air discharge, and have shown an improvement on the order of 18 kV in testing of implementations with MagJack and Broadcom gigabit PHY.

For electromagnetic reverberation testing standards defined by IEC 61000-4-4 (EFTB), requirements set by ITE and TNE are 500V/5 kHz repetition rate for industry standard, and 2000V (Level4), 5/100 kHz repetition rate for industry leaders. The integrated active EMI suppression and ESD protection circuit 1102 can improve performance to 2000V (Level4), 5 kHz and 100 kHz repetition rate.

For surge and signal line standards defined by IEC 61000-4-5, requirements set by ITE and TNE are 500V for industry standard and 2000V, Level3 for industry leaders. The integrated active EMI suppression and ESD protection circuit 1102 can improve performance to 2000V (Level3).

FIG. 11B illustrates an embodiment of a network device 1100B that implements in-line ESD protection using an ESD protection circuit 1102B that does not include EMI suppression.

Referring to FIG. 12, a graph depicts an example of a typical ESD current waveform showing the output current of an ESD generator when short-circuited to earth ground. Bandwidth of a circuit step-up is generally greater than 1 GHz. Standard tables indicate a peak current of 30 A which is greater than 8 kV/330Ω.

Lighting strike and large voltage surges are generally modeled as a capacitor charged to a high voltage and then discharged through a resistor. The values of the capacitor (C) and resistor (R) determine the type of energy burst that will occur on the device under test (DUT). If the RC time is small, the currents are generally high and last for a short time frame. If the If the RC time is larger, the currents are generally lower, but last for a longer time frame. In an illustrative example such as the case of contact discharge, a 150 pf capacitor can be charged to 8000V relative to earth ground and connected to one of the RJ45 pins of a network connector via a 330 ohm resistor. Peak discharge currents can be as large as 25 A. In a positive strike on RJ1, a protection diode will forward bias and discharge into the clamping circuit through the return path into earth ground. Any parasitic resistance due to the bond wire, skin effect, or board traces significantly increase the voltage spike across the terminals of the protection circuitry. The parasitic resistances on the contact and board trace, board trace inductances and the packaged diode bond inductances affect the strike waveform. A wave front time constant of the surge event is typically 6 ns, so that small changes in device reaction time can cause large changes in voltage events.

In contrast to the illustrative integrated ESD protection embodiments, conventional protection is often implemented by discrete components such as sidactors. A sidactor becomes operational to protect a circuit at a particular voltage, for example 60 to 72 volts but is susceptible to high frequency strikes in a very fast event lasting about a nanosecond. For example, contact discharge strike of 15000 volts can be so fast that sidactor protection fails, whereby the sidactor does not turn on fast enough and the voltage can shoot high above the specified level, resulting in passage of up to hundreds of volts before sidactor activation. In contrast, a sidactor is effective for protecting against a surge or lightning strike which is much slower and lasts longer than a contact discharge, for example lasting 20 to 40 nanoseconds, due to higher energy, for example imposing a surge in the range of thousands of volts. In response to a surge such as a lightning strike, the sidactors turn on and clamp the voltage to a set maximum such as 72 volts, drawing and dissipating energy from the current path.

The illustrative ESD protection embodiments disclosed herein can improve protection performance in comparison to discrete implementations. For example, an integrated ESD protection circuit as disclosed herein constrains the maximum possible voltage that can be imposed across protection diodes, enabling usage of reasonably-sized diodes while avoiding damage or destruction under conditions of a large voltage surge. Integration of the diodes and ESD protection circuitry substantially eliminates circuit board and bonding package parasitics of the diodes and other components in a non-integrated implementation that is susceptible to very fast transients and contact discharge into a voltage pulse that can cause high frequency ringing at voltages as large as 120 or 150 volts or more, or even 180 to 200 volts for implementations with too close spacing of components.

Integration of the protection diodes and protection circuitry also can substantially eliminate parasitic oscillations that result from dynamic current changes on circuit traces in a non-integrated implementation and the voltage which rapidly can arise on the traces. The voltage resulting from resistance on the traces can add substantially to the voltage on the line, for example increasing voltage by up to half or more of the line signal, not including ringing or overshoots that can occur due to the inductive nature of the circuit.

Figure 13:
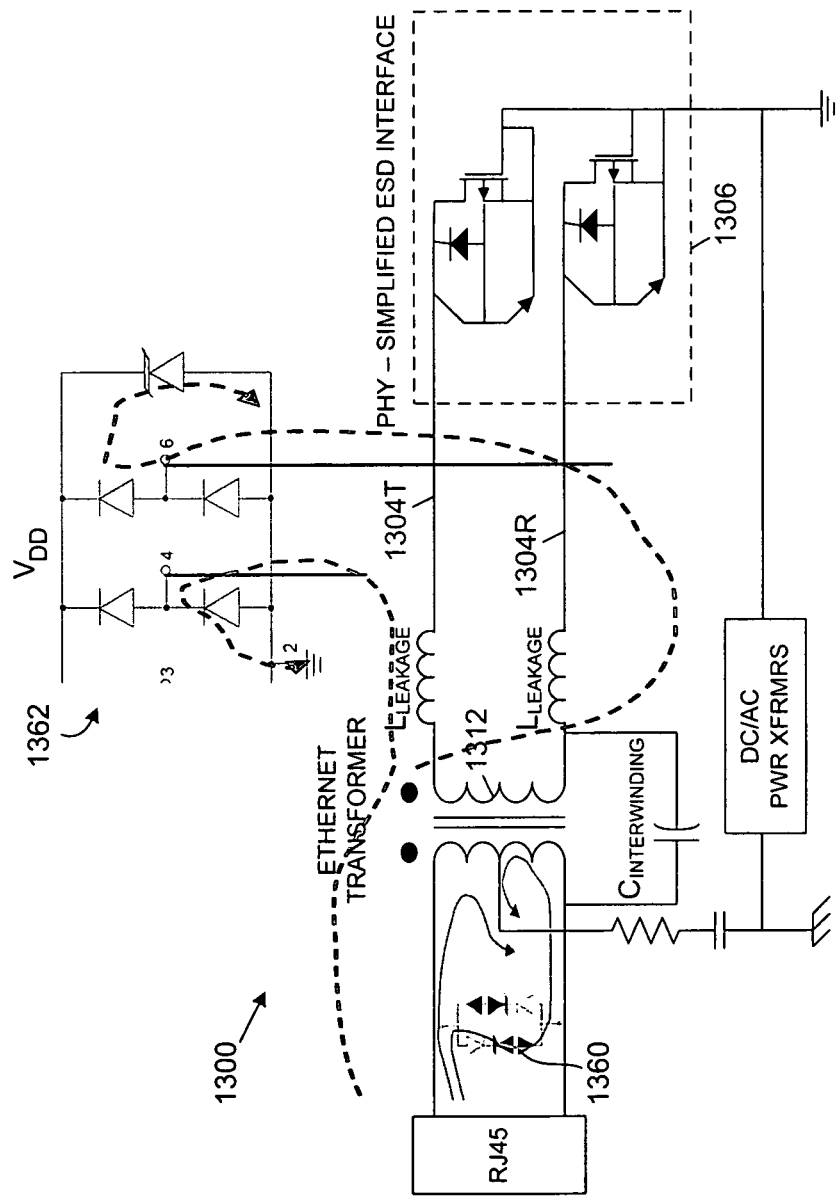
FIG. 13 is a schematic block diagram illustrating an example of an ESD protection implementation that uses external transient voltage suppression (TVS) diodes to supply ESD protection.

Referring to FIG. 13, a schematic block diagram illustrates an example of an ESD protection implementation 1300 that uses external transient voltage suppression (TVS) diodes 1360 to supply ESD protection. In contrast, the integrated active EMI suppression and ESD protection circuits illustrated in FIGS. 1 through 11 include internal integrated diodes. External TVS diodes 1360 are commonly used for line side protection and function by clamping differential energy between the two signal lines 1304T, 1304R, converting the differential energy to common-mode energy that is limited by the transformer 1312. The TVS diodes 1360 are generally configured to prevent differential and common mode energy so that the line side has good protection but results in fairly high parasitics coming from the line side. Thus design tradeoffs are associated with the use of TVS diodes 1360 which offer some surge protection but have essentially no EMI suppression functionality. The limited common-mode energy passes through the PHY 1306, ensuring protection of the PHY 1306. The ESD protection circuit 1300 also includes a diode structure 1362 on the PHY side. PHY side protection can be supplied by various types of diodes 1362 that function by accelerating TVS diode turn-on in comparison to turn-on of the PHY device 1306. The TVS diodes 1360 are biased to prevent clipping of Ethernet signals. PHY side protection works for both differential and common-mode strikes.

In contrast, the various embodiments of the integrated active EMI suppression and ESD protection circuit depicted in FIGS. 1 through 11 can operate on the PHY side alone and impart transient protection for both differential and common-mode strike events. The illustrative integrated active EMI suppression and ESD protection circuits are capable of shunting very high levels of transient energy through the protection circuits, thereby protecting the PHY. The depicted integrated active EMI suppression and ESD protection circuits can also ensure compliance with the Ethernet pulse template considerations so that surge protection is not activated in normal, non-surge operation. The diode stacks, for example diode stacks 842 as shown in FIG. 8, ensure avoidance of difficulties with the Ethernet pulse template and Ethernet specifications that can result with usage of single diode devices.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A network device comprising:
   an interface coupling an electronic device to a differential pair of signal lines;
   an integrated active common mode suppression and electrostatic discharge protection circuit coupled to the interface in parallel to differential signal lines of the electronic device and configured to add electrostatic discharge protection to electromagnetic interference suppression by inclusion of surge protection functionality on a common integrated circuit wherein the integrated active common mode suppression and electrostatic discharge protection circuit comprises first and second control transistors respectively coupled to the differential signal lines and coupled in parallel to a supply line by respective protection diodes configured for reduced capacitive loading and reduced inductive behavior; and
   at least one resistor coupled to the differential lines between the integrated active common mode suppression and electrostatic discharge protection circuit and the electronic device.

2. The network device according to claim 1 further comprising:
   the first and second control transistors respectively configured for surge protection including respective ballast resistors in series with the control transistors and a tie for transistor device toughening.

3. The network device according to claim 2 further comprising:
   the first and second control transistors configured to prevent snapback of N-channel metal oxide semiconductor (NMOS) in the integrated active common mode suppression and electrostatic discharge protection circuit and the electronic device.

4. The network device according to claim 1 wherein:
   the integrated active common mode suppression and electrostatic discharge protection circuit further comprises:
      at least one active output device coupled to the interface;
      a transformer coupled to the electronic device and comprising a center tap and windings; and
      the active common mode suppression and electrostatic discharge protection circuit is configured to draw power from the at least one active output device through the center tap of the transformer.

5. The network device according to claim 4 further comprising:
   the integrated active common mode suppression and electrostatic discharge protection circuit configured to reject electromagnetic interference (EMI) noise related in part to common mode noise through the transformer.

6. The network device according to claim 1 wherein:
   the integrated active common mode suppression and electrostatic discharge protection circuit further comprises:
      a high-bandwidth AC-coupled feedback loop that is stable when connected to a transformer and draws a predetermined amount of current unless a common mode disturbance occurs at a frequency that is higher than a predetermined normal range of frequencies, the feedback loop controlled to respond to the common mode disturbance with negative feedback that suppresses the disturbance.

7. The network device according to claim 1 wherein:
   the integrated active common mode suppression and electrostatic discharge protection circuit further comprises:
      a differential amplifier that performs alternative current (AC) coupling sensing and controls driving of signals onto a differential pair of signal lines through a center tap of an Ethernet transformer for current absorption and noise immunity.

8. The network device according to claim 1 wherein:
   the integrated active common mode suppression and electrostatic discharge protection circuit further comprises:
      a differential amplifier that performs alternative current (AC) coupling sensing and controls driving of signals onto a differential pair of signal lines through a center tap of an Ethernet transformer, enabling toleration of a wide differential signal swing.

9. The network device according to claim 1 further comprising:

the interface comprises n-channel metal oxide semiconductor (NMOS) devices, p-channel metal oxide semiconductor (PMOS) devices, or a combination of NMOS and PMOS devices.

10. A network device comprising:

an interface coupling an electronic device to a differential pair of signal lines;

an integrated active common mode suppression and electrostatic discharge protection circuit coupled to the interface in parallel to differential signal lines of the electronic device and configured to add electrostatic discharge protection to electromagnetic interference suppression by inclusion of surge protection functionality on a common integrated circuit wherein the integrated active common mode suppression and electrostatic discharge protection circuit is configured for programmable adjustment and is configured to suppress common mode noise generated as a result of differential-to-common mode conversion due to transformer imperfections; and at least one resistor coupled to the differential lines between the integrated active common mode suppression and electrostatic discharge protection circuit and the electronic device.

11. A network device comprising:

an interface coupled in parallel to differential signal lines connecting an electronic device and a differential pair operative at a voltage substantially higher than the electronic device, the interface coupled to an Ethernet transformer and comprising:

an integrated active common mode suppression and electrostatic discharge protection circuit configured to add electrostatic discharge protection to electromagnetic interference suppression by inclusion of surge protection functionality on a common integrated circuit and operative to protect against transient spikes for differential and common-mode electrostatic discharge (ESD) events by shunting transient energy to ground using protection diodes configured for reduced capacitive loading and reduced inductive behavior, and reduces common mode impedance by drawing power through a center tap of the Ethernet transformer; and at least one resistor coupled in series to the differential signal lines.

* * * * *